(12) United States Patent
Gotoh et al.

(10) Patent No.: US 7,438,476 B2
(45) Date of Patent: Oct. 21, 2008

(54) HYDRAULIC DYNAMIC BEARING AND SPINDLE MOTOR

(75) Inventors: Hiromitsu Gotoh, Chiba (JP); Ryouji Yoneyama, Chiba (JP); Atsushi Ohta, Chiba (JP)

(73) Assignee: Seiko Instruments Inc. (JP)

( * ) Notice: Subject to any disclaimer, the term of this patent is extended or adjusted under 35 U.S.C. 154(b) by 64 days.

(21) Appl. No.: 10/274,809

(22) Filed: Oct. 21, 2002

(65) Prior Publication Data

US 2007/0253651 A1      Nov. 1, 2007

(51) Int. Cl.
*F16C 17/04* (2006.01)
(52) U.S. Cl. .................................... 384/112; 384/123
(58) Field of Classification Search ........... 384/100, 384/107, 112, 121, 123
See application file for complete search history.

(56) References Cited

U.S. PATENT DOCUMENTS 6,350,059 B1 * 2/2002 Takahashi ................... 384/123
6,375,357 B2 * 4/2002 Miura et al. ................ 384/100
6,505,970 B2 * 1/2003 Takahashi et al. ........... 384/123
6,702,464 B1 * 3/2004 Takeuchi et al. ............ 384/107

* cited by examiner

*Primary Examiner*—William C Joyce
(74) *Attorney, Agent, or Firm*—Adams & Wilks

(57) ABSTRACT

A hydraulic dynamic bearing has a rotor comprised of a flanged shaft having a thrust ring portion and a cylinder portion, a hub attached to the flanged shaft, and a rotor magnet attached to an inner peripheral face of a skirt portion of the hub. A stator rotatably supports the rotor and comprises a bearing sleeve to which are attached stator coils, and a stator base plate that supports the sleeve. A gap exists between confronting surfaces of the flanged shaft and the bearing sleeve, and lubricating oil is sealed in the gap. Thrust dynamic pressure generating grooves are formed in one or both faces of the thrust ring, and the grooves are in the form of a herringbone pattern having radial inner groove sections and outer groove sections. The depth of the inner groove sections is shallower than that of the outer groove sections, and the depths of both groove sections are constant. The optimum inner-to-outer groove depth ratio is 0.6 to 0.7.

10 Claims, 9 Drawing Sheets

Side at which flow velocity is low

Side at which flow velocity is high

THRUST DYNAMIC PRESSURE DISTRIBUTION IN
HYDRAULIC DYNAMIC BEARING
ACCORDING TO THE INVENTION

HYDRAULIC DYNAMIC BEARING AND SPINDLE MOTOR

BACKGROUND OF THE INVENTION

1. Technical Field to which the Invention Belongs

The present invention relates to a hydraulic dynamic bearing comprising a flanged shaft having a thrust ring portion and a cylinder portion, a single bag-like stepped sleeve in which there are formed in order a small diameter cylinder portion, a large diameter cylinder portion and a cylindrical open end portion, a presser ring pressure-inserted and fixed to the cylindrical open end portion of the sleeve, and a lubricating oil sealed in a fine gap including a thrust gap formed between these bearing constituting members, and to a spindle motor having this hydraulic dynamic bearing. In particular, it relates to a structure of a thrust dynamic pressure generating groove of the hydraulic dynamic bearing.

2. Prior Art

In Japanese Patent Laid-Open No. 32828/2001 Gazette, there are disclosed a hydraulic dynamic bearing comprising a flanged shaft having a thrust ring portion and a cylinder portion, a single bag-like stepped sleeve in which there are formed in order a small diameter cylinder portion, a large diameter cylinder portion and a cylindrical open end portion, a presser ring pressure-inserted and fixed to the cylindrical open end portion of the sleeve, and a lubricating oil sealed in a fine gap including a thrust gap formed between these bearing constituting members, characterized in that a thrust dynamic pressure generating groove provided either of a stationary face and a rotation face, which form the thrust gap, is formed such that its depth becomes gradually deep from a side at which a flow velocity of the lubricating oil flowing through the thrust gap is low toward a side at which it is high, and a spindle motor having this hydraulic dynamic bearing.

In a thrust dynamic bearing portion adopting the thrust dynamic pressure generating groove of such a structure, the lubricating oil that is a pressure generating fluid held between the shaft and the sleeve is pulled into the thrust dynamic pressure generating groove by a relative rotary motion of both the bearing constituting members. A pattern of this thrust dynamic pressure generating groove is an optional pattern such as spiral and herringbone.

Although the lubricating oil flows in the thrust dynamic pressure generating groove by a flow line complying with the pattern, since a depth of the thrust dynamic pressure generating groove becomes shallow as going from an inlet to an interior along the flow line, a dynamic pressure in the thrust gap becomes high as a whole. In short, the hydraulic dynamic bearing adopting the thrust dynamic pressure generating groove of the structure mentioned above can efficiently generate a higher thrust dynamic pressure in comparison with the hydraulic dynamic bearing in which the groove depth does not change along the flow line. A pressure pattern of the thrust dynamic pressure of this thrust dynamic bearing portion is as shown in FIG. 5.

However, as shown in FIG. 5, in the thrust dynamic bearing portion of the structure mentioned above, since the lubricating oil is abruptly pulled into the thrust dynamic pressure generating groove, the lubricating oil is subjected to a negative pressure in the vicinity of an inlet, so that bubbles are generated in that place. Whereupon, such a situation occurs that the lubricating oil flowing through the thrust gap at high speed is interrupted, so that there arises such an unfavorable situation that the thrust dynamic pressure becomes unstable and thus a deflection of an NRRO, etc. is increased. And, in the worst case, the shaft is seized by the sleeve, and thus the rotation is stopped.

Further, even if it is the thrust dynamic pressure generating groove formed with the groove depth being kept constant, a pressure in its flange diameter direction becomes a negative pressure. That is, if the maximum pressure and the flange diameter direction pressure are simulated by changing the depth of the thrust dynamic pressure generating groove in a range of 5 μm to 20 μm, the maximum pressure changes in a range of 100 kPa to 140 kPa and the flange diameter direction pressure changes in a range of−30 kPa to−40 kPa as shown in FIG. 7. In either groove depth, the flange diameter direction pressure is a negative pressure.

In case where the thrust dynamic pressure generating groove of such a spiral pattern that the groove depth becomes gradually deep from the side at which the flow velocity of the lubricating oil flowing through the thrust gap is low toward the side at which it is high, is provided in upper and lower faces of a thrust ring 3 of a flanged shaft 1 constituting the hydraulic dynamic bearing of a spindle motor of FIG. 1, the negative pressure mentioned above is generated in a fine gap between an outer peripheral face of the thrust ring 3 and an inner peripheral face of a large diameter cylinder portion of a stepped sleeve 4. Further, in case where the thrust dynamic pressure generating groove of a herringbone pattern is provided, the negative pressure mentioned above is generated in the fine gap between the outer peripheral face of the thrust ring 3 and the inner peripheral face of the large diameter cylinder portion of the stepped sleeve 4, and in the vicinities of shaft sides in the upper and lower faces of the thrust ring 3.

Further, also in case where the thrust dynamic pressure Generation groove whose depth is kept constant is provided in Upper and lower faces of the thrust ring 3 of the flanged shaft 1 constituting the hydraulic dynamic bearing of the spindle Motor of FIG. 1, thew negative pressure is generated similarly to the above

SUMMARY OF THE INVENTION

In order to suppress such a negative pressure to a low value, such a countermeasure is considered that a through-hole is provided in the thrust ring 3, but this countermeasure is high in cost and not practical.

A problem to be solved by the invention is to efficiently generate a high thrust dynamic pressure and prevent a lubricating oil in a thrust dynamic pressure generating groove from being subjected to a negative pressure in the vicinity of an inlet, in a hydraulic dynamic bearing comprising a flanged shaft having a thrust ring portion and a cylinder portion, a single bag-like stepped sleeve in which there are formed in order a small diameter cylinder portion, a large diameter cylinder portion and a cylindrical open end portion, a presser ring pressure-inserted and fixed to the cylindrical open end portion of the sleeve, and a lubricating oil sealed in a fine gap including a thrust gap formed between these bearing constituting members.

In order to solve the above problem, the invention provides a hydraulic dynamic bearing comprising a flanged shaft having a thrust ring portion and a cylinder portion, a single bag-like stepped sleeve in which there are formed in order a small diameter cylinder portion, a large diameter cylinder portion and a cylindrical open end portion, a presser ring pressure-inserted and fixed to the cylindrical open end portion of the sleeve, and a lubricating oil sealed in a fine gap including a thrust gap formed between these bearing constituting members, characterized in that a thrust dynamic pressure generating groove of a spiral pattern provided in either of a stationary face and a rotation face, which form the thrust gap, is formed such that its depth becomes gradually deep from a side at which a flow velocity of the lubricating oil flowing through the thrust gap is low toward a side at which it is high.

Further, in order to solve the above problem, the invention provides a hydraulic dynamic bearing comprising a flanged shaft having a thrust ring portion and a cylinder portion, a single bag-like stepped sleeve in which there are formed in order a small diameter cylinder portion, a large diameter cylinder portion and a cylindrical open end portion, a presser ring pressure-inserted and fixed to the cylindrical open end portion of the sleeve, and a lubricating oil sealed in a fine gap including a thrust gap formed between these bearing constituting members, characterized in that a thrust dynamic pressure generating groove of a herringbone pattern provided in either of a stationary face and a rotation face, which form the thrust gap, is formed such that its depth becomes shallow in an inner peripheral face side than a return point of the pattern and deep in an outer peripheral face side. And, a groove depth ratio between the shallowest groove and the deepest groove is selected in a range of 0.6 to 0.7.

BRIEF DESCRIPTION OF THE DRAWINGS

FIG. 1 is a sectional view of a spindle motor of one embodiment of the invention, which shows exaggeratedly a fine gap including a thrust gap and a radial gap, and a thrust dynamic pressure generating groove G2.

Figure 1:
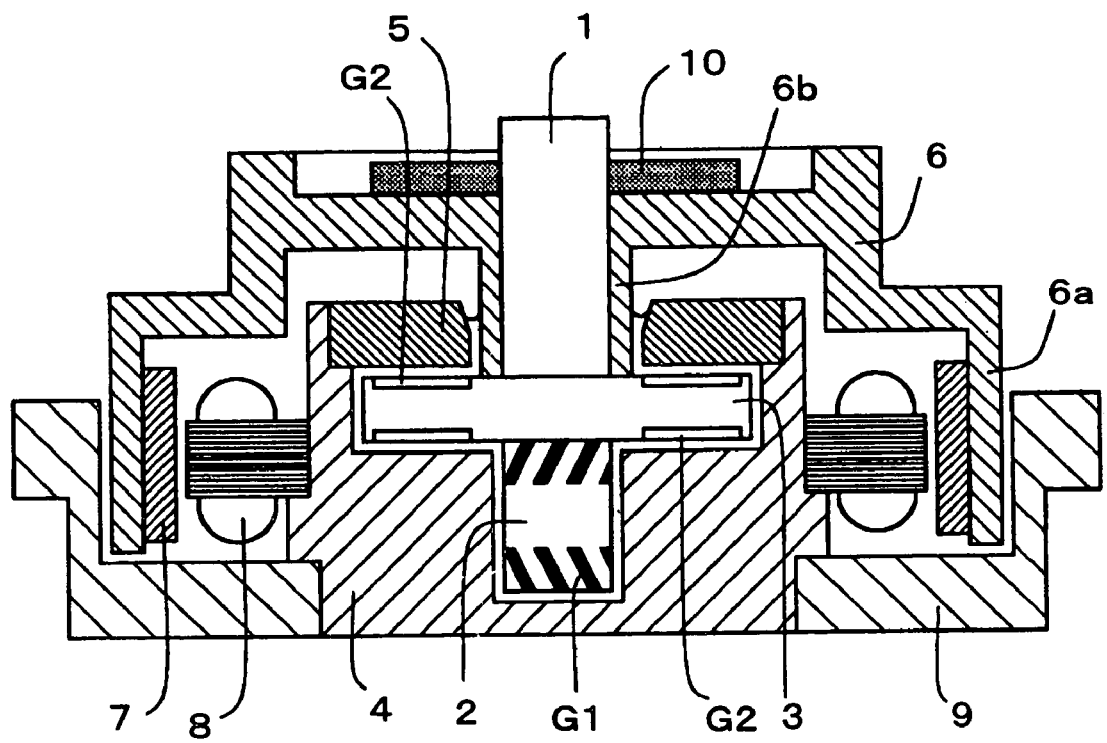
FIG. 1 is a sectional view of one embodiment fo a spindle motor having a hydraulic dynamic bearing according to the invention.

In the spindle motor shown in FIG. 1, a rotor includes a cup-like hub 6 having a cylindrical skirt portion 6a and a boss portion 6b, and a rotor magnet 7 attached to an inner peripheral face of the cylindrical skirt portion 6a. Further, a stator includes a base plate 9, and a stator coil 8 attached to an outer peripheral face of the sleeve 4 of a hydraulic dynamic bearing vertically provided on the base plate 9.

The hydraulic dynamic bearing rotatably supporting the rotor on the stator has, as its main constituent members, the flanged shaft 1 having the thrust ring 3 and a cylinder portion 2, the stepped sleeve 4 having a cylindrical open end portion, and a presser ring 5 pressure- inserted and fixed to the cylindrical open end portion of the stepped sleeve 4. The stepped sleeve 4 is closed at one end (bottom end in FIG. 1) and has a stepped interior concavity that opens at the other end of the sleeve. This sleeve construction is referred to herein as a "single bag-like stepped sleeve" to denote that the concavity, like a bag, is open at one end.

In the single bag-like stepped sleeve 4, a small diameter cylinder portion is formed in its closed end portion side, and a large diameter cylinder portion is formed between the cylindrical open end portion and the small diameter cylinder portion. If the flanged shaft 1 is inserted into the single bag-like stepped sleeve 4, a lower outer peripheral face of the cylinder portion 2 of the flanged shaft 1 is opposed to an inner peripheral face of the small diameter cylinder portion, and by these faces a radial gap is formed. A radial dynamic pressure generating groove G1 like the herringbone groove is provided in a lower outer peripheral face of the cylinder portion 2 of the flanged shaft 1.

If the flanged shaft 1 is inserted into the single bag-like stepped sleeve 4 and, additionally, the presser ring 5 is pressure-inserted and fixed to the cylindrical open end portion of the single bag-like stepped sleeve 4, an upper face of the thrust ring 3 of the flanged shaft 1 is opposed to a lower face of the presser ring 5, and a 1st thrust gap is formed by these faces. Further, a lower face of the thrust ring is opposed to a surface of a stepped portion, which is a boundary face between the large diameter cylinder portion and the small diameter cylinder portion, and a 2nd thrust gap is formed by these faces. A thrust dynamic pressure generating groove G2 is provided in upper and lower surfaces of the thrust ring 3, which are rotation faces.

And, a lubricating oil is sealed in a fine gap including the radial gap, the 1st thrust gap and the 2nd thrust gap formed between the main bearing constituting members (i.e., the flanged shaft 1, the single bag-like stepped sleeve 4 and the presser ring 5), and in a fine gap formed between an inner peripheral face of the presser ring and an outer peripheral face of the boss portion 6b of the cup-like hub 6.

Figure 3A:
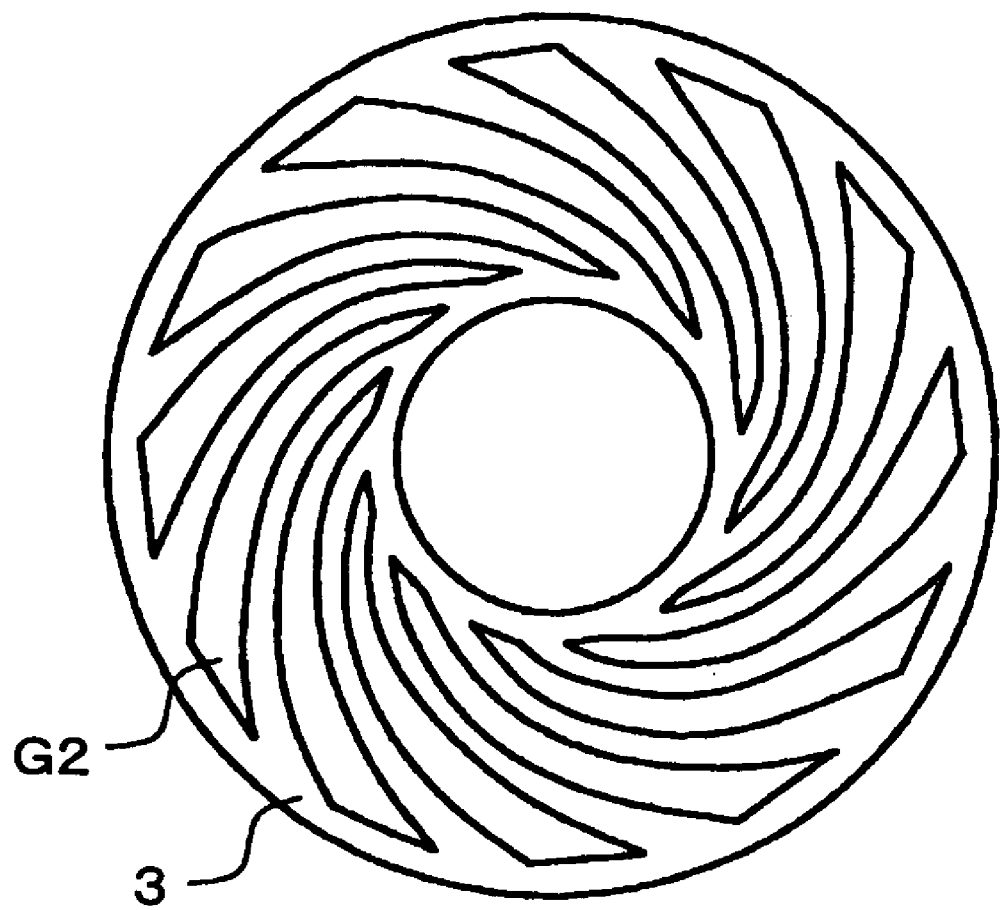
FIG. 3A is a plan view of a thrust ring 3 in case where the thrust dynamic pressure generating groove is the spiral pattern.
Figure 3B:
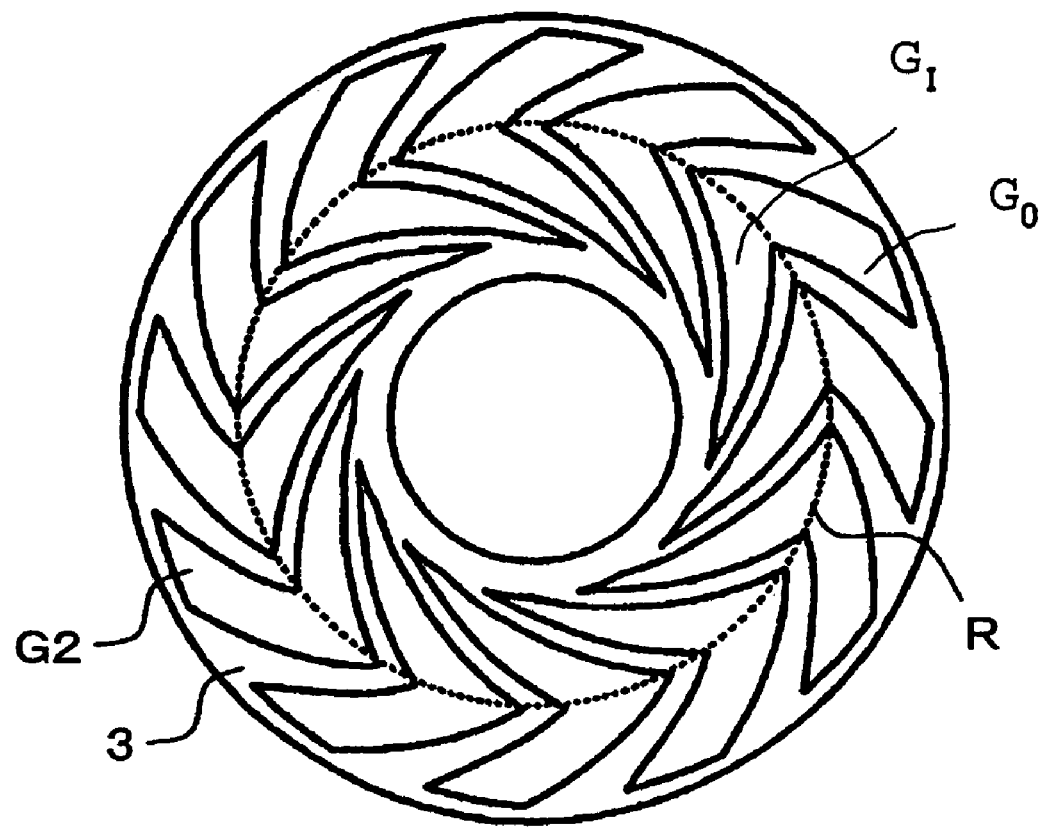
FIG. 3B is a plan view of the thrust ring 3 in case where the thrust dynamic pressure generating groove is the herringbone pattern.
Figure 4:
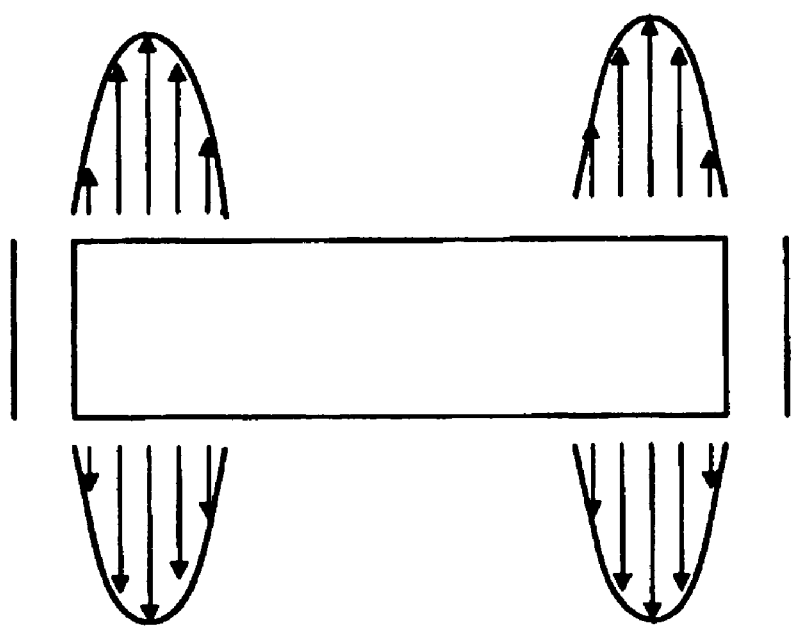
FIG. 4 is a thrust dynamic pressure distribution pattern in the hydraulic dynamic bearing according to the invention.
Figure 5:
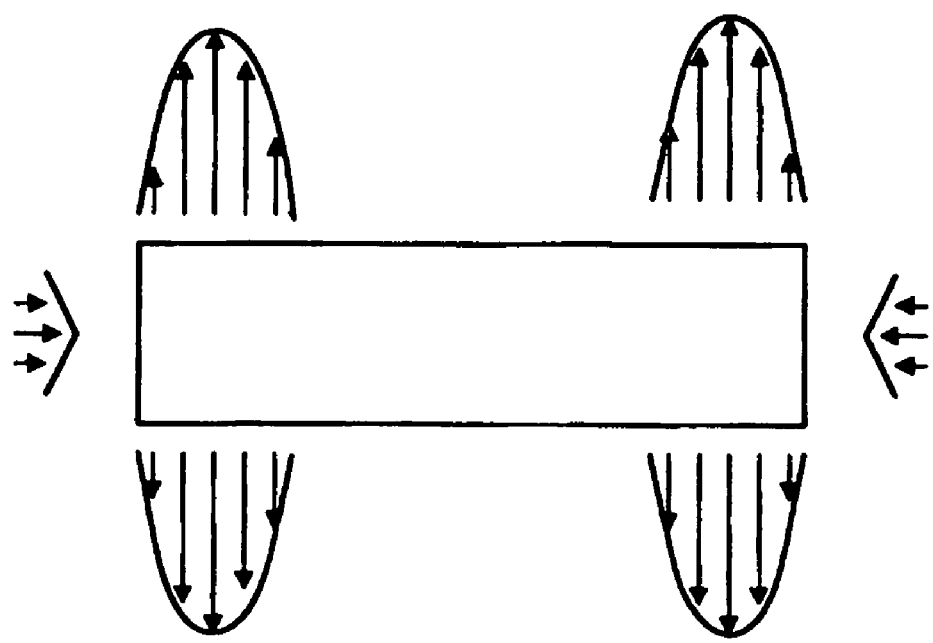
FIG. 5 is a thrust dynamic pressure distribution pattern in a conventional hydraulic dynamic bearing.

The thrust dynamic pressure generating groove G2 provided in the upper and lower faces of the thrust ring 3 by cutting or etching is such a spiral pattern groove as shown in FIG. 3A, or such a herringbone groove as shown in FIG. 3B. And, the groove depth is formed so as to become shallow in a side at which a flow velocity of the lubricating oil flowing through the thrust gap is low and deep in a side at which it is high.

Figure 2A:
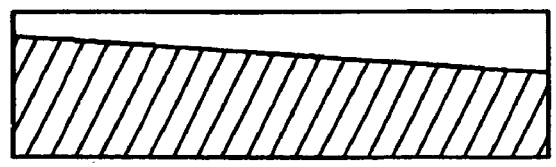
FIG. 2A is a partial sectional view of a thurst ring whose groove depth is shown exaggeratedly in case where a thrust dynamic pressure generating groove is a spiral pattern.

That is, the thrust dynamic pressure generating groove G2 formed in the surface of the thrust ring 3 which is a constituent member of the hydraulic dynamic bearing in the invention is formed such that its depth becomes gradually deep from the side at which the flow velocity of the lubricating oil flowing through the thrust gap is low toward the side at which it is high in case of the spiral pattern groove as shown by a partial sectional view of FIG. 2A.

Figure 2B:
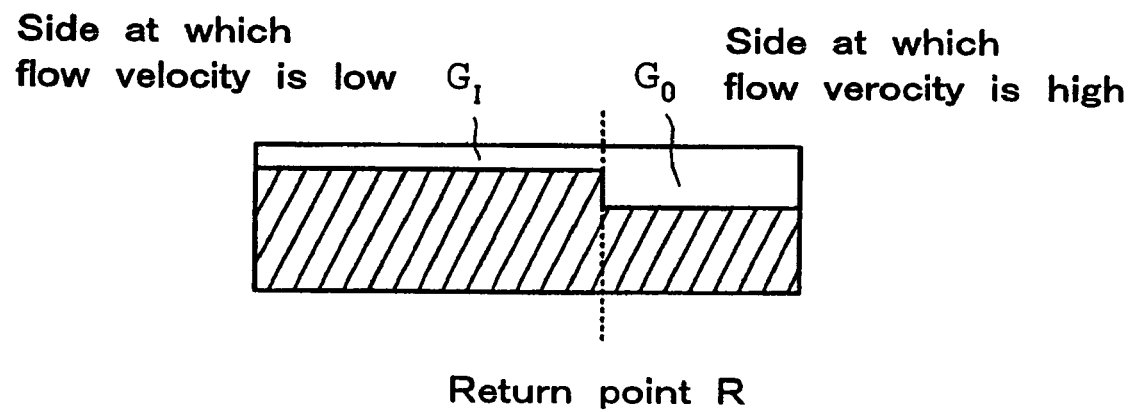
FIG. 2B is a partial sectional view of the thrust ring whose groove depth is shown exaggeratively in case where the thrust dynamic pressure generating groove is a herringbone pattern.

Further, the thrust dynamic pressure generating groove G2 formed in the surface of the thrust ring 3 which is a constituent member of the hydraulic dynamic bearing in the invention is formed such that its depth is shallow in an inner peripheral face side than a return point R of the pattern and deep in an outer pieripheral face side in case of the herringbone pattern groove as shown by a partial sectional view of FIG. 2B. Stated otherwise, each groove of the herringbone pattern has an inner groove section $G_I$ that is radially inward of the return point R and outer groove section $G_O$ that is radially outward of the return point (FIGS. 2B,3B), and the groove sections $G_I$, $G_O$ are each of constant, uniform depth as illustrated in FIG. 2B.

Figure 6:
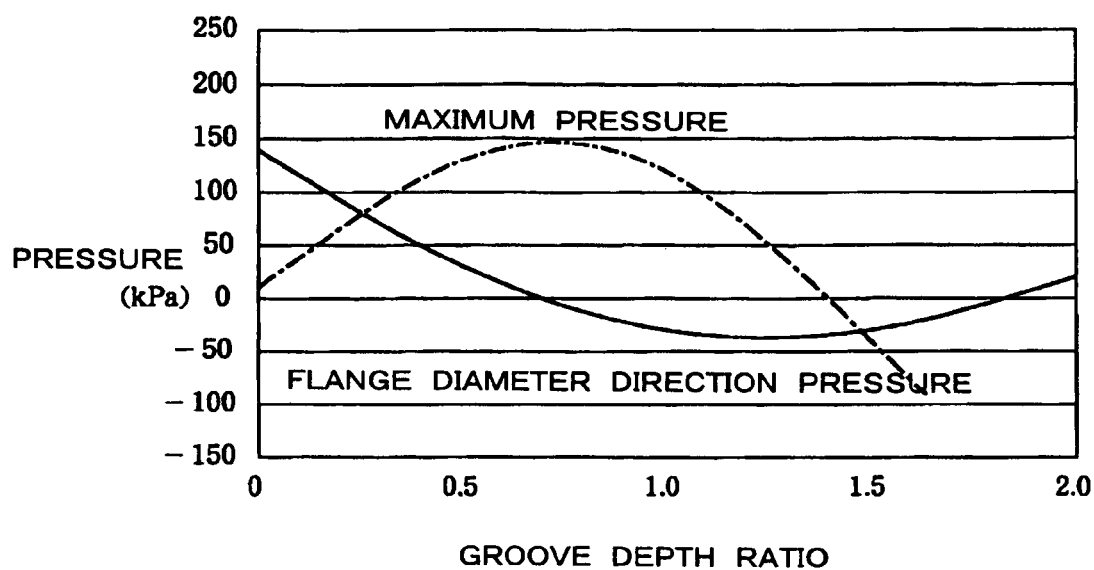
FIG. 6 is a characteristic diagram showing how a maximum pressure and a flange diameter direction pressure of a thrust bearing portion in the hydraulic dynamic bearing in the invention are changed by a groove depth ratio.
Figure 7:
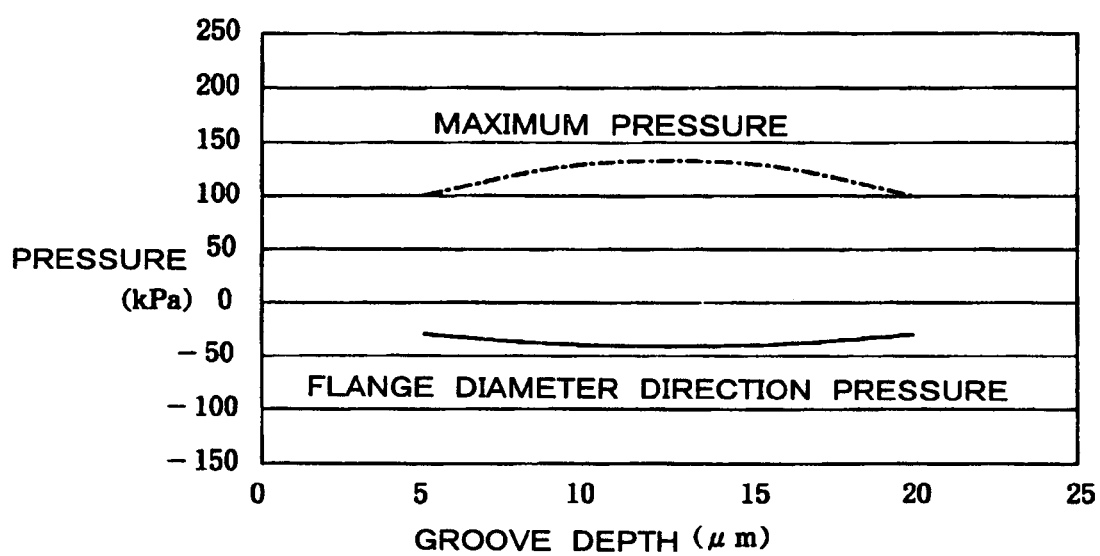
FIG. 7 is a characteristic diagram showing how the maximum pressure and the flnage diameter direction pressure of a thrust bearing portion in the conventional hydraulic dynamic bearing are changed by a groove depth.

By the way, as to the groove depth of the thrust dynamic pressure generating groove, the shallowest one is 5 μm and the deepest one is about 20 μm. So, if a maximum pressure and a flange diameter direction pressure are simulated by changing a ratio of the groove depth between the shallowest groove and the deepest groove, i.e., (the shallowest groove depth)/(the deepest groove depth), in a range of 0 to 2.0, it becomes as shown in FIG. 6. That is, the maximum pressure is a positive pressure when the groove depth ratio is 0 to 1.4, and it becomes a negative pressure if the groove depth ratio exceeds 1.4. When the groove depth ratio is 0.7, the maximum value 145 kPa is shown.

On the other hand, if the groove depth ratio is changed in a range of 0 to 2.0, the flange diameter direction pressure changes in a range of –30 kPa to 140 kPa. And, when the groove depth ratio is in a range of 0.7 to 1.8, the flange diameter direction pressure becomes a negative pressure.

As to the thrust dynamic pressure generating groove in the invention, its groove depth ratio is selected on the basis of the characteristic diagram shown in FIG. 6, i.e., the characteristic diagram showing how the maximum pressure and the flange diameter direction pressure of the thrust bearing portion in the hydraulic dynamic bearing of the invention are changed by the groove depth ratio. That is, as to the thrust dynamic pressure generating groove in the invention, an optimum value of the groove depth ratio is 0.6 to 0.7. This is because if the groove depth ratio is 0.6 to 0.7, the flange diameter direction pressure of the thrust bearing portion is a positive small value and its maximum pressure becomes 140 kPa to 145 kPa.

As to a dynamic pressure of the thrust bearing in the hydraulic dynamic bearing according to the invention, that has the thrust ring 3 in which there is formed such a thrust dynamic pressure generating groove as mentioned above, a high thrust dynamic pressure is distributed in a vertical direction at both sides of the shaft, but the flange diameter direction pressure does not become a negative pressure and is almost zero.

EFFECT OF THE INVENTION

By the invention, it is possible to efficiently generate the high thrust dynamic pressure and prevent the lubricating oil in the thrust dynamic pressure generating groove from being subjected to the negative pressure in the vicinity of the inlet, in the hydraulic dynamic bearing comprising the flanged shaft having the thrust ring portion and the cylinder portion, the single bag-like stepped sleeve in which there are formed in order the small diameter cylinder portion, the large diameter cylinder portion and the cylindrical open end portion, the presser ring pressure-inserted and fixed to the cylindrical open end portion of the sleeve, and the lubricating oil sealed in the fine gap including the thrust gap formed between these bearing constituting members.

Accordingly, in the spindle motor having the hydraulic dynamic bearing according to the invention, the large deflection of the NRRO, etc. owing to the negative pressure is not generated.

The invention claimed is:

1. A hydraulic dynamic bearing comprising: a flanged shaft having a thrust ring portion and a cylinder portion, a stepped sleeve having in order a small diameter cylinder portion, a large diameter cylinder portion and a cylindrical open end portion, a presser ring inserted into and fixed to the cylindrical open end portion of the sleeve, and a lubricating oil sealed in a fine gap including a thrust gap between the flanged shaft and the stepped sleeve, wherein a thrust dynamic pressure generating groove of a herringbone pattern is provided in either of a stationary face of the stepped sleeve and a rotation face of the flanged shaft, which form the thrust gap, the depth of the groove in an inner peripheral face side up to a return point of the herringbone pattern is shallower than the depth of the groove in an outer peripheral face side, and the depth of the groove is constant in the inner peripheral face side and in the outer peripheral face side.

2. A hydraulic dynamic bearing according to claim 1, wherein a depth ratio between the shallowest groove and the deepest groove is selected in a range of 0.6 to 0.7.

3. A spindle motor in which a rotor is rotatably supported on a stator by a hydraulic dynamic bearing according to claim 1.

4. A hydraulic dynamic bearing comprising: a rotor having a thrust ring portion having two opposed rotor faces; a stator having an interior space in which is rotatably disposed the rotor and having two opposed stator faces that confront respective ones of the rotor faces to define a thrust gap therebetween; and thrust dynamic pressure generating grooves provided in one or more of the rotor faces and stator faces, the grooves in each face being in the form of a herringbone pattern and each groove having an inner groove section that is of constant depth and that is radially inward of a return point of the herringbone pattern and an outer groove section that is of constant depth and that is radially outward of the return point, and the depth of the inner groove sections being shallower than that of the outer groove sections.

5. A hydraulic dynamic bearing according to claim 4; wherein the thrust dynamic pressure generating grooves are provided on both of the rotor faces.

6. A spindle motor having a rotor rotatably supported by a stator via a hydraulic dynamic bearing according to claim 5.

7. A hydraulic dynamic bearing according to claim 4; wherein the thrust dynamic pressure generating grooves are provieed on one or both of the rotor faces.

8. A hydraulic dynamic bearing according to claim 4; wherein the depth ratio between the depth of the inner groove sections and the depth of the outer groove sections is in a range of 0.6 to 0.7.

9. A hydraulic dynamic bearing according to claim 8; wherein the thrust dynamic pressure generating grooves are provided on both of the rotor faces.

10. A hydraulic dynamic bearing according to claim 8; wherein the thrust dynamic pressure generating grooves are provieed on one or both of the rotor faces.

* * * * *